US010055477B2

(12) United States Patent
Nojima

(10) Patent No.: US 10,055,477 B2
(45) Date of Patent: Aug. 21, 2018

(54) DATA COLLECTION APPARATUS AND DATA COLLECTION PROGRAM

(75) Inventor: Akira Nojima, Minato-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 477 days.

(21) Appl. No.: 14/356,445

(22) PCT Filed: Jun. 26, 2012

(86) PCT No.: PCT/JP2012/066200
§ 371 (c)(1),
(2), (4) Date: May 6, 2014

(87) PCT Pub. No.: WO2014/002178
PCT Pub. Date: Jan. 3, 2014

(65) Prior Publication Data
US 2014/0289250 A1    Sep. 25, 2014

(51) Int. Cl.
*G06F 17/30* (2006.01)
*G05B 19/41* (2006.01)
(Continued)

(52) U.S. Cl.
CPC ... *G06F 17/30598* (2013.01); *G05B 19/4183* (2013.01); *G06Q 10/06* (2013.01);
(Continued)

(58) Field of Classification Search
None
See application file for complete search history.

(56) References Cited

U.S. PATENT DOCUMENTS

| 4,839,798 A * | 6/1989 | Eguchi | G06F 9/5088 |
| | | | 709/201 |
| 4,897,777 A * | 1/1990 | Janke | G05B 19/052 |
| | | | 700/5 |

(Continued)

FOREIGN PATENT DOCUMENTS

| CN | 1532709 A | 9/2004 |
| CN | 101364097 A | 2/2009 |

(Continued)

OTHER PUBLICATIONS

TekSoft Scada RTU's; 1997; Publushed at http://members.iinet.net.au/~ianw/rtu.html.*

(Continued)

*Primary Examiner* — Reginald G Bragdon
*Assistant Examiner* — Paul M Knight
(74) *Attorney, Agent, or Firm* — Oblon, McClelland, Maier & Neustadt, L.L.P.

(57) ABSTRACT

Provided are a first storage unit 411b configured to store the data which are transmitted among the control apparatuses 21 to 24; a group selector 414a configured to divide the memory area in the first storage unit 411b into multiple groups, to further divide the memory area in each group into multiple subgroups, and to select at least one divided subgroups as a collection group, which is a unit to continuously read data in the group; a schedule generator 414b configured to generate the schedule, on the basis of the number of subgroups selected as each collection group and the collection cycle for the data collection; and a data reader 414e configured to read the data on the basis of the generated schedule.

7 Claims, 8 Drawing Sheets

(51) Int. Cl.
  *G06Q 10/06* (2012.01)
  *H04Q 9/00* (2006.01)
  *G05B 19/418* (2006.01)

(52) U.S. Cl.
  CPC ..... *H04Q 9/00* (2013.01); *G05B 2219/37532* (2013.01); *G05B 2219/37533* (2013.01); *H04Q 2209/10* (2013.01); *H04Q 2209/30* (2013.01); *Y02P 90/10* (2015.11); *Y02P 90/20* (2015.11)

(56) References Cited

U.S. PATENT DOCUMENTS

| | | | | |
|---|---|---|---|---|
| 4,975,833 | A * | 12/1990 | Jinzaki | G06F 9/52 700/5 |
| 5,400,329 | A * | 3/1995 | Tokura | H04L 12/5602 370/232 |
| 5,461,570 | A * | 10/1995 | Wang | A61L 2/24 700/110 |
| 5,636,141 | A * | 6/1997 | Hiramatsu | H04N 5/907 360/32 |
| 5,926,633 | A * | 7/1999 | Takagi | G06F 9/4443 345/619 |
| 5,944,792 | A * | 8/1999 | Yamato | H04N 21/23 348/E5.008 |
| 6,101,184 | A * | 8/2000 | Tobe | H04Q 11/0478 370/390 |
| 6,487,457 | B1 * | 11/2002 | Hull | G05B 15/02 700/17 |
| 6,880,050 | B1 * | 4/2005 | Korger | G06F 5/12 710/55 |
| 6,907,499 | B2 * | 6/2005 | Herbst | G06F 3/0601 360/78.07 |
| 8,055,287 | B1 * | 11/2011 | Upadhyay | H04W 4/001 370/230.1 |
| 8,145,815 | B2 * | 3/2012 | Higuchi | G06F 13/374 700/3 |
| 2002/0027917 | A1 * | 3/2002 | Sugai | H04L 45/00 370/394 |
| 2002/0068588 | A1 * | 6/2002 | Yoshida | H04L 1/0002 455/461 |
| 2002/0124132 | A1 * | 9/2002 | Haines | G06F 3/0613 711/112 |
| 2004/0049643 | A1 * | 3/2004 | Alavarez | G06F 11/1076 711/162 |
| 2004/0066746 | A1 * | 4/2004 | Matsunaga | H04L 47/10 370/235 |
| 2004/0177221 | A1 * | 9/2004 | Bridge | G06F 3/0611 711/114 |
| 2006/0079966 | A1 * | 4/2006 | Ashida | G05B 19/0421 700/14 |
| 2006/0282634 | A1 * | 12/2006 | Ohtsuka | G06F 3/0613 711/167 |
| 2009/0062956 | A1 * | 3/2009 | Chen | G05B 19/4189 700/214 |
| 2009/0132851 | A1 * | 5/2009 | Pruthi | G06F 11/1076 714/6.12 |
| 2009/0138128 | A1 * | 5/2009 | Fusi | F02C 3/30 700/282 |
| 2010/0061207 | A1 * | 3/2010 | Trantham | G11B 27/36 369/53.1 |
| 2012/0011857 | A1 * | 1/2012 | Becker | F02C 3/04 60/806 |
| 2013/0086302 | A1 * | 4/2013 | Tressler | G06F 3/0679 711/103 |

FOREIGN PATENT DOCUMENTS

| | | |
|---|---|---|
| CN | 202058149 U | 11/2011 |
| JP | 6 209493 | 7/1994 |
| JP | 10 69498 | 3/1998 |
| JP | 2001 5516 | 1/2001 |
| JP | 2002 163180 | 6/2002 |
| JP | 2004 274201 | 9/2004 |
| JP | 2005094289 A * | 4/2005 |
| JP | 2009 205486 | 9/2009 |
| JP | 2009 251874 | 10/2009 |
| JP | 2010 271850 | 12/2010 |
| JP | 2011 237929 | 11/2011 |
| JP | 2012 18438 | 1/2012 |
| WO | 2012 004954 | 1/2012 |

OTHER PUBLICATIONS

Loop Checking: A Technician's Guide, Harley Jeffrey, International Society of Automation 2005.*
Scheduling Real Time Transactions A Performance Evaluation, by Abbott; ACM 1992 (Year: 1992).*
Control Scheduling Codesign of Real Time Systems, by Cervin; Journal of Embedded Computing, 2004 (Year: 2004).*
International Search Report dated Sep. 25, 2012 in PCT/JP12/066200 Filed Jun. 26, 2012.
Combined Chinese Office Action and Search Report dated Aug. 31, 2015 in Patent Application No. 201280058825.8 (with English translation of categories of cited documents).

* cited by examiner

FIG. 7

| TIME | 1 | 2 | 3 | 4 | 5 | 6 | 7 | 8 | 9 | 10 | 11 | 12 | 13 |
|---|---|---|---|---|---|---|---|---|---|---|---|---|---|
| HIGH SPEED | 10 | 9 | 10 | 9 | 10 | 9 | 10 | 9 | 10 | 9 | 10 | 9 | 10 |
| MIDDLE SPEED | 3 | 3 | 3 | 3 | 3 | 2 | 2 | 2 | 2 | 2 | 2 | 2 | 2 |
| LOW SPEED | 1 | 1 | 1 | 1 | 1 | 1 | 1 | 1 | 1 | 1 | 1 | 1 | 1 |

| TIME | 14 | 15 | 16 | 17 | 18 | 19 | 20 | 21 | 22 | 23 | 24 | 25 | 26 |
|---|---|---|---|---|---|---|---|---|---|---|---|---|---|
| HIGH SPEED | 9 | 10 | 9 | 10 | 9 | 10 | 9 | 10 | 9 | 10 | 9 | 10 | 9 |
| MIDDLE SPEED | 2 | 2 | 2 | 3 | 3 | 3 | 2 | 2 | 2 | 2 | 2 | 2 | 3 |
| LOW SPEED | 1 | 1 | 1 | 1 | 1 | 1 | 1 | 1 | 1 | 1 | 1 | 1 | 1 |

⋮

| TIME | 40 | 41 | 42 | 43 | 44 | 45 | 46 | 47 | 48 | 49 | 50 | 51 | 52 |
|---|---|---|---|---|---|---|---|---|---|---|---|---|---|
| HIGH SPEED | 9 | 10 | 9 | 10 | 9 | 10 | 9 | 10 | 9 | 10 | 9 | 10 | 9 |
| MIDDLE SPEED | 2 | 2 | 2 | 2 | 2 | 2 | 2 | 2 | 2 | 2 | 2 | 2 | 2 |
| LOW SPEED | 1 | 0 | 0 | 0 | 0 | 0 | 0 | 0 | 0 | 0 | 0 | 0 | 0 |

⋮

| TIME | 196 | 197 | 198 | 199 | 200 | 201 | 202 | 203 | 204 | 205 | 206 | 207 | 208 |
|---|---|---|---|---|---|---|---|---|---|---|---|---|---|
| HIGH SPEED | 9 | 10 | 9 | 10 | 9 | 10 | 9 | 10 | 9 | 10 | 9 | 10 | 9 |
| MIDDLE SPEED | 2 | 2 | 2 | 2 | 2 | 2 | 2 | 2 | 2 | 2 | 2 | 2 | 2 |
| LOW SPEED | 0 | 0 | 0 | 0 | 0 | 1 | 1 | 1 | 1 | 1 | 1 | 1 | 1 |

DATA COLLECTION APPARATUS AND DATA COLLECTION PROGRAM

TECHNICAL FIELD

The present invention relates to a data collection apparatus, and a data collection program, for collecting data from control apparatuses which are widely used to control industrial systems such as: an FA sector including iron and steel plants, paper mill plants, and assembly operations in the automobile industry and the like; a PA sector including chemical plants; and a water supply and sewage systems as well as other utility systems.

BACKGROUND ART

Among generally-used control systems for controlling control objects such as plant equipment, there is a control system which is formed from multiple control apparatuses connected together via a network and controls the plant equipment by transferring control information among the control apparatuses via the network.

There is another control system which monitors the plant equipment by collecting data, such as process values, from the control apparatuses via the network.

There has been an idea that: a control system stores data on control of the plant equipment; and, for example, when an abnormal condition occurs in the plant equipment, the stored data are analyzed for use to examine causes of the occurrence of the abnormal condition, and to make plans about how to deal with the abnormal condition. To realize the idea, data need to be quickly collected from the control apparatuses.

Patent Document 1 has proposed a data collection apparatus for an iron and steel plant system which is configured to: collect binary data of control information outputted from a control apparatus to an iron and steel plant; collect binary data of event information on the iron and steel plant controlled by use of the control information outputted from the control apparatus; add a common key to the binary data of the control information and the binary data of the event information which are collected at the same time; accumulate the binary data of the control information together with the attached common keys; and accumulate the binary data of the event information together with the attached common keys.

PRIOR ART DOCUMENT

Patent Document

Patent Document 1: Japanese Patent Application Publication No. 2010-271850

SUMMARY OF INVENTION

Problem to be Solved by Invention

Some recent network cards installed in control apparatuses each include a built-in memory for sharing data, and are configured to transfer large amounts of data stored in the memories at high speed among multiple control apparatuses by DMA (Direct Memory Access).

Nevertheless, when the data collection system described in Patent Document 1 shares data by DMA, the processing speed of the transfer of small amounts of data is more likely to decrease.

The present invention has been made with the foregoing problem taken into consideration. The present invention aims at providing a data collection apparatus and a data collection program which are capable of quickly collecting data regardless of the amount of data by using a simple configuration.

Means for Solving the Problems

For the purpose of achieving the foregoing object, a first feature of a data collection apparatus of the present invention is that the data collection apparatus includes: a storage unit configured to store data which are sent among multiple control apparatuses by scan transmission; a group selector configured to divide a memory area in the storage unit into multiple groups, to further divide a memory area in each group into multiple subgroups, and to select one or more of the divided subgroups, as each of collection groups which is a unit to continuously read the data in one of the groups, in order to avoid decrease in a readout speed of the data on the basis of a data transfer rate characteristic corresponding to the size of the data; a schedule generator configured to generate a schedule for reading the data from the storage unit every unit time on the basis of the number of subgroups selected as each collection group and collection cycles for collecting the data; and a data reader configured to read the data from the storage unit on the basis of the generated schedule.

A second feature of the data collection apparatus of the present invention is that the data collection apparatus further includes: a time calculator configured to calculate an amount of time it takes to read the data every unit time, as a needed readout time, on the basis of the schedule generated by the schedule generator; and a judgment unit configured to judge whether or not the readout of the data can be completed within the unit time, on the basis of the needed readout time calculated by the time calculator. Here, if the judgment unit judges that the readout of the data can be completed within the unit time, the data reader reads the data from the storage unit.

A third feature of the data collection apparatus of the present invention is that the time calculator calculates, as the needed readout time, a value obtained by multiplying a data transfer rate and the number of collection groups per unit time in the schedule generated by the schedule generator.

A fourth feature of the data collection apparatus of the present invention is that if the needed readout time calculated by the time calculator is equal to or greater than a threshold length of time obtained by subtracting a predetermined time allowance from the unit time, the judgment unit judges that the readout of the data cannot be completed within the unit time, and issues a warning.

A fifth feature of the data collection apparatus of the present invention is that, if data requested to be read are not included in the selected subgroups, the schedule generator once again generates the schedule in order to read the requested data from the storage unit in a time period when the number of collection groups per unit time is the smallest.

For the purpose of achieving the foregoing object, a first feature of a data collection program of the present invention is that the data collection program causes a computer to execute: a storing step of storing data, which are sent among multiple control apparatuses by scan transmission, in a storage unit; a group selecting step of dividing a memory area in the storage unit into multiple groups, further dividing a memory area in each group into multiple subgroups, and selecting one or more of the divided subgroups, as each of collection groups which is a unit to continuously read the data in one of the groups, in order to avoid decrease in a readout speed of the data on the basis of a data transfer rate characteristic corresponding to the size of the data; a schedule generating step of generating a schedule for reading the data from the storage unit every unit time on the basis of the number of subgroups selected as each collection group and collection cycles for collecting the data; and a data reading step of reading the data from the storage unit on the basis of the generated schedule.

A second feature of the data collection program of the present invention is that the data collection program causes the computer to further execute: a time calculating step of calculating an amount of time it takes to read the data every unit time, as a needed readout time, on the basis of the schedule generated in the schedule generating step; and a judging step of judging whether or not the readout of the data can be completed within the unit time, on the basis of the needed readout time calculated in the time calculating step, and that if judgment is made in the judging step that the readout of the data can be completed within the unit time, the data is read from the storage unit in the reading step.

A third feature of the data collection program of the present invention is that a value obtained by multiplying a data transfer rate and the number of collection groups per unit time in the schedule generated by the schedule generating step is calculated as the needed readout time in the time calculating step.

A fourth feature of the data collection program of the present invention is that if the needed readout time calculated in the time calculating step is equal to or greater than a threshold length of time obtained by subtracting a predetermined time allowance from the unit time, judgment is made that the readout of the data cannot be completed within the unit time and a warning is issued in the judging step.

A fifth feature of the data collection program of the present invention is that if data requested to be read are not included in the selected subgroups, the schedule is generated once again in the schedule generating step in order to read the requested data from the storage unit in a time period when the number of collection groups per unit time is the smallest.

Effects of the Invention

The data collection apparatus and the data collection program of the present invention are capable of quickly collecting data regardless of the amount of data by using a simple configuration.

FIG. 7 is a diagram showing examples of a schedule generated by a schedule generator included in the data collection apparatus in the data collection system of the first embodiment of the present invention.

Figure 1:
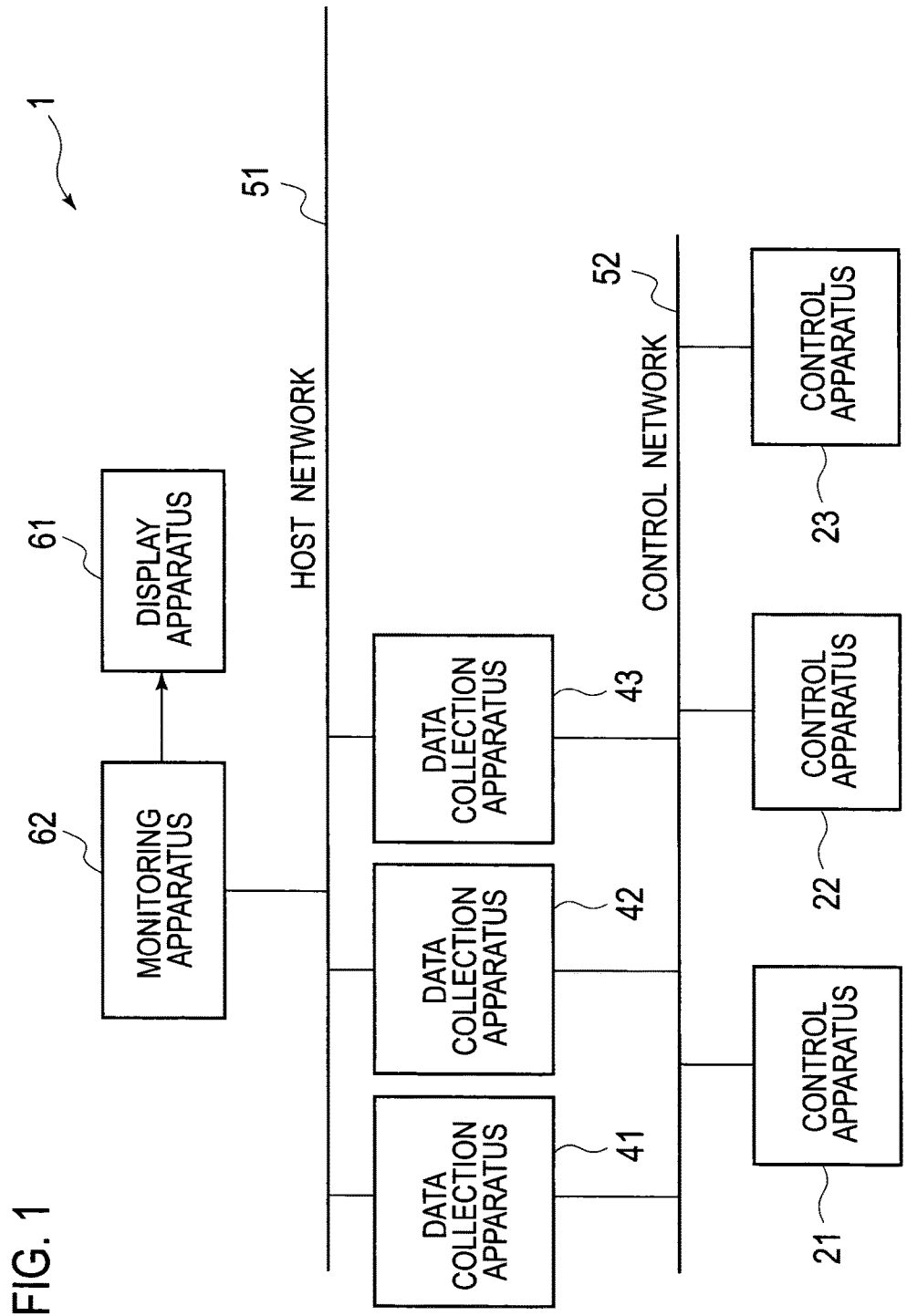
FIG. 1 is a diagram showing connecting relationships in a data collection system of a first embodiment of the present invention.

Referring to the drawings, descriptions will be hereinbelow provided for the best mode for carrying out the invention.

<First Embodiment>

FIG. 1 is a diagram showing connecting relationships in a data collection system of a first embodiment of the present invention.

As shown in FIG. 1, a data collection system 1 of the first embodiment of the present invention includes control apparatuses 21, 22 and data collection apparatuses 41 to 43, which are connected together via a control network 52. The data collection system 1 further includes a monitoring apparatus 62, which is connected to the data collection apparatuses 41 to 43 via a host network 51.

Each of the control apparatuses 21, 22 is formed from a control controller whose typical example is a PLC (Programmable Logic Controller).

The data collection apparatuses 41 to 43 collect data supplied from the control apparatuses 21 to 22. In this respect, when the control target is plant equipment in a hot rolling plant, for example, the data include various kinds of data on the plant control apparatuses needed to operate the hot rolling plant. Examples of the data are production instruction data, production result data, alarm data, roll data, model calculation data, model learning data, invariable data and parameter data.

Furthermore, the data collection apparatuses 41 to 43 and the control apparatuses 21, 22 connected to the control network 52 include their respective common memories. The common memories collectively play a function as a network apparatus by scan transmission (cyclic transmission) which transmits control data among the apparatuses.

To this end, each common memory is provided with transmission data areas and reception data areas assigned to the apparatuses. Thereby, data in the transmission data area in the control apparatus 21, for example, are transferred to the common memories in all of the other apparatuses connected to the control network 52 by one round of data transmission. Descriptions will be provided later for the concept of the scan transmission among the common memories.

A display apparatus 61 includes an image output unit such as an organic EL (electroluminescence) display or a liquid crystal display, and is connected to the monitoring apparatus 62. The display apparatus 61 displays graphs and the like on the basis of output signals supplied from the monitoring apparatus 62.

On the basis of process data supplied from the data collection apparatuses 41 to 43, the monitoring apparatus 62 causes the display apparatus 61 to display multiple data with their time axes aligned with each other.

Figure 2:
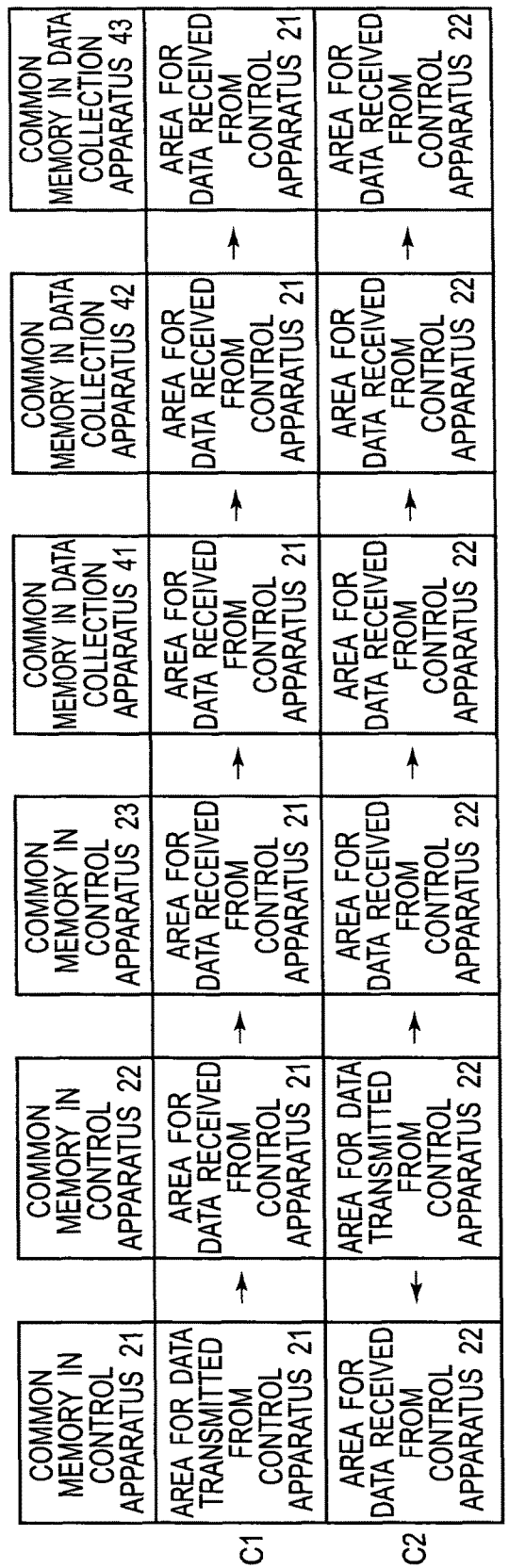
FIG. 2 is a diagram schematically showing a concept of a scan transmission among common memories included, respectively, in control apparatuses and data collection apparatuses in the data collection system of the first embodiment of the present invention.

FIG. 2 is a diagram schematically showing the concept of the scan transmission among the common memories included, respectively, in the control apparatuses 21, 22 and the data collection apparatuses 41 to 43 in the data collection system 1 of the first embodiment of the present invention.

As shown in the line C1 in FIG. 2, for each control cycle, data in the transmission data area in the control apparatus 21 are transferred to the common memories in all of the other apparatuses (the control apparatuses 22, 23 and the data collection apparatuses 41 to 43) connected to the same transmission line in one round of the data transmission. As shown in the line C2, for each control cycle, data in a transmission data area in the control apparatus 22 are similarly transferred to the common memories in all of the other apparatuses (the control apparatuses 21, 23 and the data collection apparatuses 41 to 43).

As described above, each common memory is provided with the transmission data area assigned to the apparatus of its own, and the transmission data areas assigned respectively to the other apparatuses; and data are sent to the common memories in all of the other apparatuses by scan transmission. For this reason, all the apparatuses can share the same data.

Figure 3:
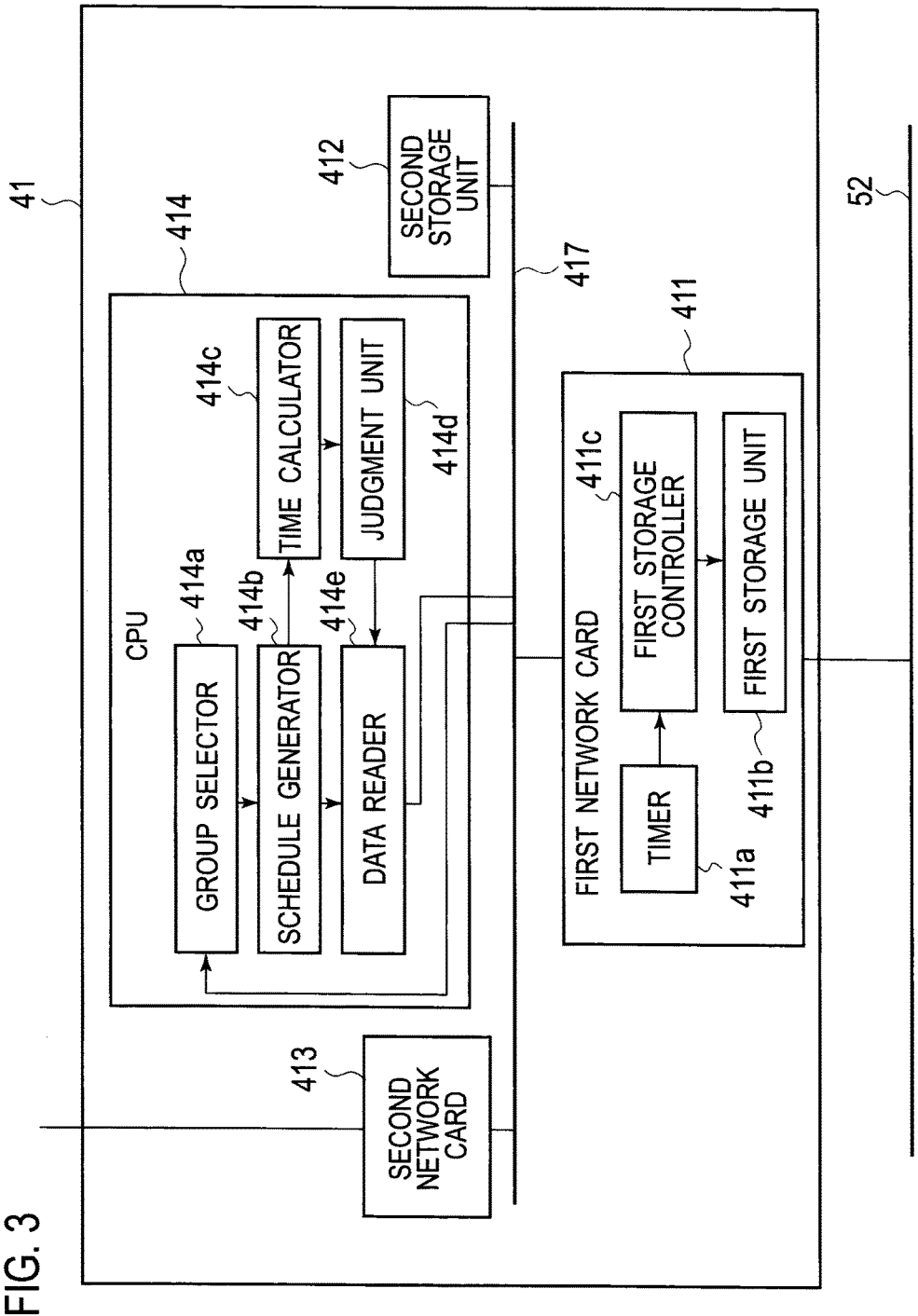
FIG. 3 is a diagram showing configurations of respective data collection apparatuses included in the data collection system of the first embodiment of the present invention.

FIG. 3 is a diagram showing a configuration of the data collection apparatus 41 included in the data collection system 1 of the first embodiment of the present invention. The data correction apparatuses 41 to 43 have the same configuration, and the following descriptions will therefore be provided for the data collection apparatus 41 on their behalf.

As shown in FIG. 3, the data collection apparatus 41 includes a first network card 411, a second storage unit 412, a second network card 413 and a CPU 414, which are connected together via a bus 417.

The first network card 411 is an interface card configured to connect with the control network 52. The first network card 411 includes a self-operating timer 411a for measuring time, a first storage unit 411b, and a first storage controller 411c.

The first storage unit 411b is the above-mentioned common memory, and stores data supplied from the control apparatuses 21, 22.

Once data in the transmission data area in the first storage unit 411b is rewritten with new data, the first storage controller 411c sends the new data to the other apparatuses by scan transmission. In addition, upon reception of new data by scan transmission, the first storage controller 411c rewrites old data in the reception data area in the first storage unit 411b with the new data.

The second storage unit 412 associates the time measured by the timer 411a with the data stored in the first storage unit 411b on the basis of an instruction from the CPU 414, and stores the time and the data thus associated as process data. In addition, the second storage unit 412 stores a predetermined collection group pattern on the basis of a transfer rate characteristic corresponding to the size of the data.

The second network card 413 is an interface card configured to connect with the host network 51.

The CPU 414 centrally controls the data collection apparatus 41. In addition, the CPU 414 includes a group selector 414a, a schedule generator 414b, a time calculator 414c, a judgment unit 414d and a data reader 414e.

The group selector 414a divides a memory area in the first storage unit 411b into multiple groups, and further divides the memory area in each group into multiple subgroups.

Figure 4:
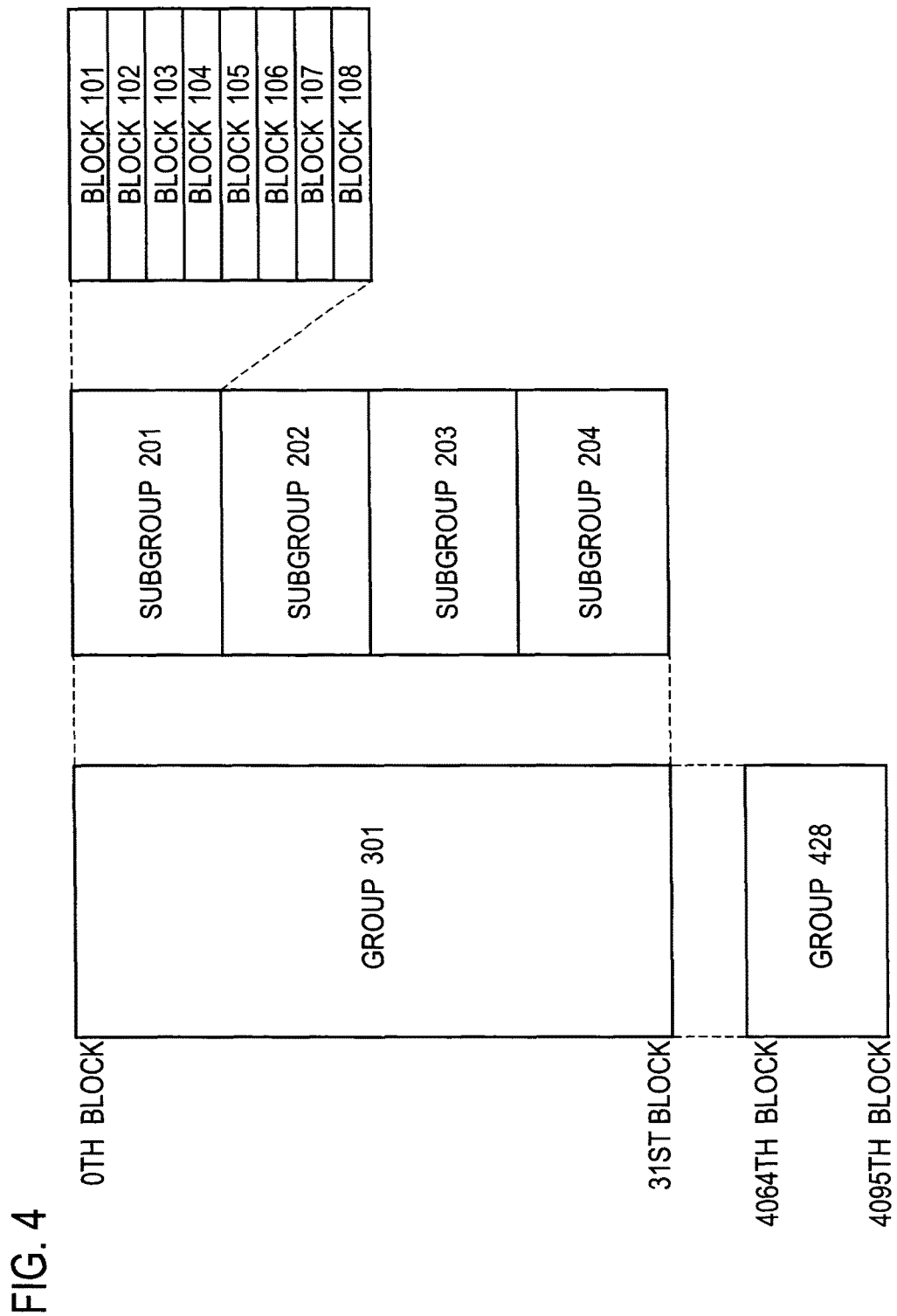
FIG. 4 is a diagram showing a memory area in a first storage unit included in one of the data collection apparatuses in the data collection system of the first embodiment of the present invention.

FIG. 4 is a diagram showing the memory area in the first storage unit 411b included in the data collection apparatus 41 in the data collection system 1 of the first embodiment of the present invention.

As shown in FIG. 4, the group selector 414a divides the memory area in a way that: beginning at the top of the memory area in the first storage unit 411b, each collection of 128 bytes is treated as one block; and 8 blocks, such as blocks 101 to 108, are treated as one subgroup.

Furthermore, the group selector 414a treats four subgroups, for example subgroups 201 to 204, as a group 301.

Since the group selector 414a thus divides the memory area hierarchically, data stored in the memory area can be read efficiently when the reading is performed on a subgroup-to-subgroup basis as will be described later.

Moreover, the group selector 414a selects at least one divided subgroup as a collection group, which is a unit to continuously read data in a group, in order to avoid decrease in the data readout speed on the basis of the data transfer rate characteristic corresponding to the size of the data. In this respect, the data size is more likely to affect the data transfer rate to a large extent, depending on the telecommunications standard, the network setting, or the like. For example, the use of the DMA method in data transfer enables high-speed transfer of large amounts of data. However, in the case of transferring a small amount of data stored in a distributed manner in the storage unit, the data may be transferred faster if the data transfer is carried out without using the DMA method. As described above, the data transfer rate characteristic may vary depending on the transferred data size. With this taken into consideration, the group selector 414a selects the collection group, which is the unit for the continuous reading, in order to avoid decrease in the data readout speed, namely, the speed at which to read from the first storage unit 411b.

The schedule generator 414b generates a schedule for reading data from the first storage unit 411b every unit time on the basis of: the number of subgroups selected as the collection groups; and collection cycles for the data collection.

In addition, if data requested to be read is not included in a selected subgroup, the schedule generator 414b once again generates the schedule in order to read the requested data from the first storage unit 411b in a time period when the number of collection groups per unit time is the smallest.

The time calculator 414c calculates the amount of time it takes to read the data every unit time, as a needed readout time, on the basis of the schedule generated by the schedule generator 414b. To put it specifically, the time calculator 414c calculates, as the needed readout time, a value obtained by multiplying together the data transfer rate and the number of collection groups per unit time in accordance with the schedule generated by the schedule generator 414b.

On the basis of the needed readout time calculated by the time calculator 414c, the judgment unit 414d judges whether or not the data readout can be completed within the unit time. To put it specifically, if the needed readout time calculated by the time calculator 414c is equal to or greater than a threshold length of time obtained by subtracting a predetermined time allowance from the unit time, the judgment unit 414d judges that the data readout cannot be completed within the unit time, and issues a warning.

If the judgment unit 414d judges that the data readout can be completed within the unit time, the data reader 414e reads the data from the storage unit.

Figure 5:
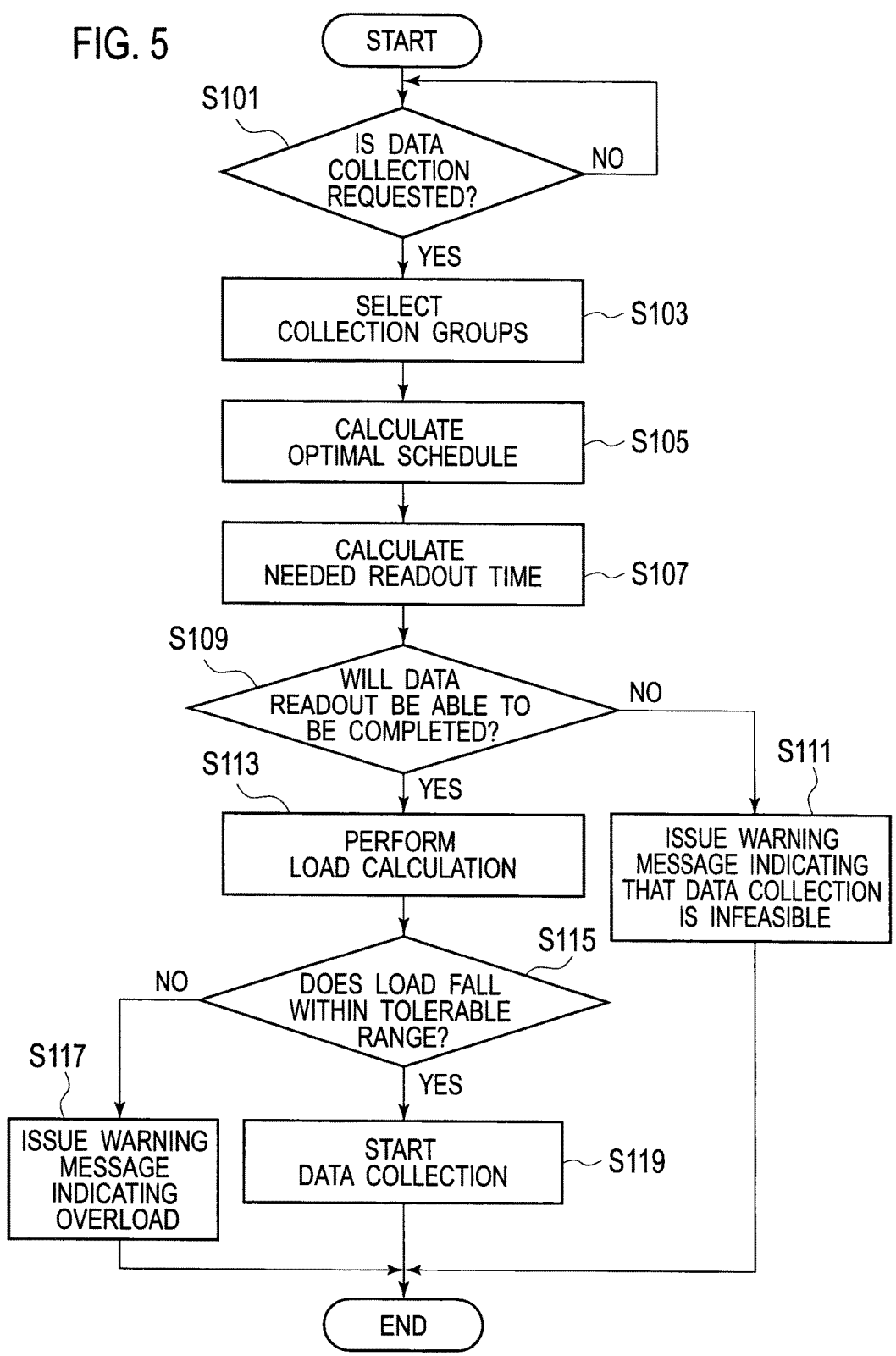
FIG. 5 is a flowchart showing process procedures of processing to be performed by the data collection apparatus included in the data collection system of the first embodiment of the present invention.

FIG. 5 is a flowchart showing process procedures of processing to be performed by the data collection apparatus 41 included in the data collection system 1 of the first embodiment of the present invention.

As shown in FIG. 5, once the data collection is requested (step S101), the group selector 414a in the CPU 414 selects the collection group (step S103). To put it specifically, the group selector 414a divides the memory area in the first storage unit 411b into multiple groups, and further divides the memory area in each group into multiple subgroups. Subsequently, the group selector 414a selects at least one divided subgroups as the collection group, which is the unit to continuously read the data in the group, in order to avoid decrease in the data readout speed on the basis of the transfer rate characteristic corresponding to the size of the data.

Figure 6:
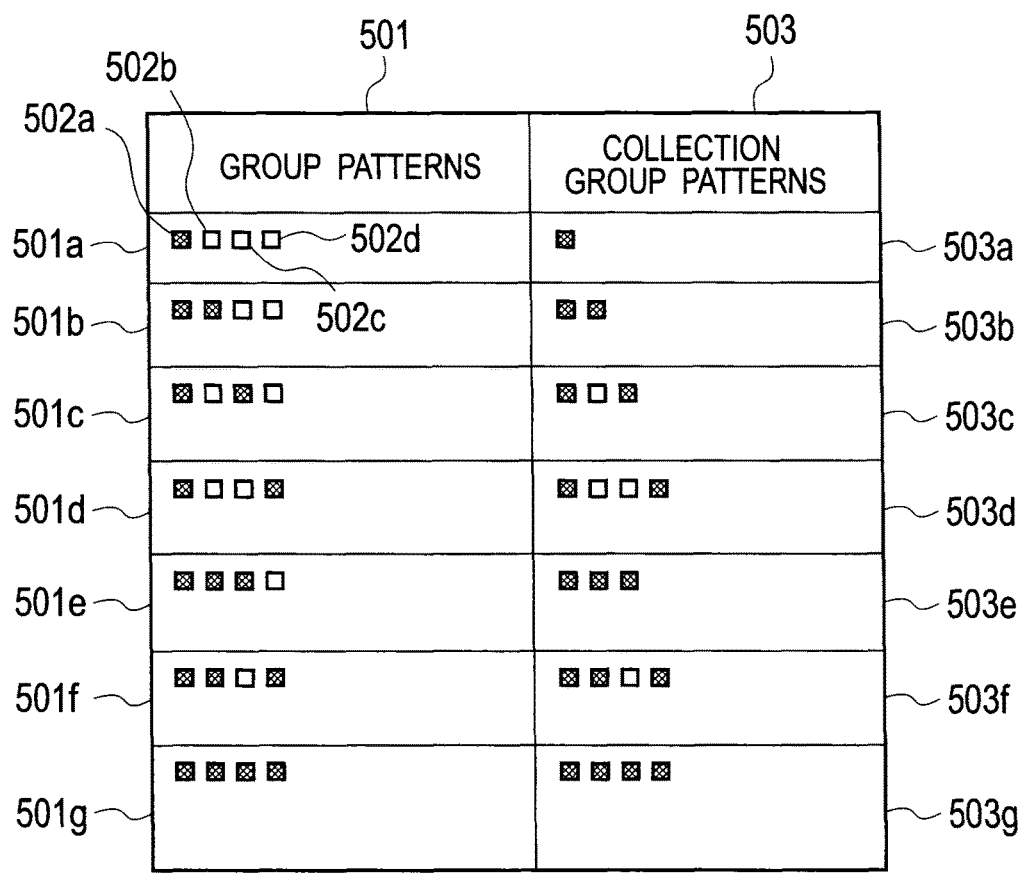
FIG. 6 is a diagram for explaining collection group patterns to be selected by a group selector included in the data collection apparatus in the data collection system of the first embodiment of the present invention.

FIG. 6 is a diagram for explaining patterns of the collection group to be selected by the group selector 414a included in the data collection apparatus 41 in the data collection system 1 of the first embodiment of the present invention. The patterns of the collection group are predetermined on the basis of the transfer rate characteristics corresponding to the respective data sizes, and are stored in the second storage unit 412 as the collection group patterns.

The group selector 414a selects the collection group on the basis of the corresponding collection group pattern stored in the second storage unit 412.

As shown in FIG. 6, each group pattern 501 indicates a pattern of the subgroup arrangement. "■" denotes a subgroup where data are registered in the first storage unit 411b, and "□" denotes a subgroup where no data are registered in the first storage unit 411b.

For example, a group pattern 501a is indicated with "■ □ □ □." This means that data are registered in a subgroup 502a at the top while no data are registered in subgroups 502b to 502d.

In the case of the group pattern 501a, a collection group pattern 503a is indicated as "■."

This shows that, judging from the transfer rate characteristic, the transfer rate, namely the readout speed is faster when only the subgroup 502a is read than when all the subgroups 502a to 502d are read.

A group pattern 501b is indicated with "■ ■ □ □." This means that data are registered in the subgroups 502a, 502b at the top while no data are registered in the subgroups 502c, 502d.

In the case of the group pattern 501b, a collection group pattern 503b is indicated as "■ ■."

This shows that, judging from the transfer rate characteristic, the transfer rate, namely the readout speed is faster when only the subgroups 502a, 502b are read than when all the subgroups 502a to 502d are read.

A group pattern 501c is indicated with "■ □ ■ □." This means that data are registered in the subgroups 502a, 502c while no data are registered in the subgroups 502b, 502c.

In the case of the group pattern 501c, a collection group pattern 503c is indicated as "■ □ ■."

This shows that, judging from the transfer rate characteristic, the transfer rate, namely the readout speed is faster when only the subgroups 502a to 502c, which include the subgroup 502b intervening between the subgroups 502a, 502c, are read than when the subgroups 502a, 502c are read one by one.

A group pattern 501d is indicated with "■ □ □ ■." This means that data are registered in the subgroups 502a, 502d while no data are registered in the subgroups 502b, 502c.

In the case of the group pattern 501d, a collection group pattern 503d is indicated as "■ □ □ ■."

This shows that, judging from the transfer rate characteristic, the transfer rate, namely the readout speed is faster when only the subgroups 502a to 502d, which include the subgroups 502b, 502c intervening between the subgroups 502a, 502d, are read than when the subgroups 502a, 502d are read one by one.

A group pattern 501e is indicated with "■ ■ ■ □." This means that data are registered in the subgroups 502a to 502C at the top while no data are registered in the subgroup 502d.

In the case of the group pattern 501e, a collection group pattern 503e is indicated as "■ ■ ■."

This shows that, judging from the transfer rate characteristic, the transfer rate, namely the readout speed is faster when only the subgroups 502a to 502c are read than when all the subgroups 502a to 502d are read.

A group pattern 501f is indicated with "■ ■ □ ■." This means that data are registered in the subgroups 502a, 502b, 502d while no data are registered in the subgroup 502c.

In the case of the group pattern 501f, a collection group pattern 503f is indicated as "■ ■ □ ■."

This shows that, judging from the transfer rate characteristic, the transfer rate, namely the readout speed is faster when all the subgroups 502a to 502d, which includes the subgroup 502c, are read than when the subgroups 502a, 502b, 502d are read one by one.

A group pattern 501g is indicated with "■ ■ ■ ■." This means that data are registered in all the subgroups 502a to 502d.

In the case of the group pattern 501g, a collection group pattern 503g is indicated as "■ ■ ■ ■" as a matter of course.

As described above, the collection group patterns predetermined on the basis of the transfer rate characteristics corresponding to the respective data sizes are stored in the second storage unit 412. The group selector 414a is capable of selecting one from the collection group patterns as the collection group. Thereby, the group selector 414a is capable of selecting at least one divided subgroups as the collection group, which is the unit to continuously read data in the group, in order to avoid decrease in the data readout speed on the basis of the transfer rate characteristic corresponding to the size of the data.

Returning to FIG. 5, the schedule generator 414b in the CPU 414 calculates an optimal schedule (step S105). To put it specifically, the schedule generator 414b generates a schedule for reading data from the first storage unit 411b every unit time (1 millisecond in this case) on the basis of: the number of subgroups selected as the collection group by the group selector 414a; and collection cycles for the data collection.

For example, the schedule generator 414b determines the number of collection groups per unit time in the collection cycle, in the form of an integer value, on the basis of a value obtained by dividing the number of collection groups, which are selected by the group selector 414a, by the number of collection cycles for the data collection. Thereafter, the schedule generator 414b generates the schedule by arranging the determined value for each unit time.

FIG. 7 is a diagram showing examples of the schedule to be generated by the schedule generator 414b included in the data collection apparatus 41 in the data collection system 1 of the first embodiment of the present invention. In this respect, let us assume that: there are three collection cycles for high, middle and low speeds; the collection cycle for the high-speed collection is a 2-millisecond cycle; the collection cycle for the middle-speed collection is s 25-millisecond cycle; and the collection cycle for the low-speed collection is a 200-millisecond cycle. Furthermore, in this respect, let us assume that: the number of collection groups selected by the group selector 414a is 114; the number of collection groups for the high-speed collection is "19"; the number of collection groups for the middle-speed collection is "55"; and the number of collection groups for the low-speed collection is "40."

In the case of the high-speed collection, the schedule generator 414b determines that the numbers of collection groups per unit time in the collection cycle are 10 or 9 in the form of an integer value, because "9.5" is obtained when the number (=19) of collection groups selected by the group selector 414a is divided by the number (=2) of collection cycles for the data collection.

In the corresponding example shown in FIG. 7, the schedule generator 414b sets the number of collection groups per unit time at "10" for time 1, and at "9" for time 2 which is the subsequent unit time. After that, similarly, the schedule generator 414b sets the number of collection groups per unit time at "10" for time 3, and at "9" for time 4 which is the ensuing unit time.

In the case of the middle-speed collection, the schedule generator 414b determines that the numbers of collection groups per unit time in the collection cycle are "2" or "3" in the form of an integer value, because "2.2" is obtained when the number (=55) of collection groups selected by the group selector 414a is divided by the number (=25) of collection cycles for the data collection.

For example, the schedule generator 414b determines that the numbers of collection groups per unit time are 3, 3, 3, 3, 3, 2, 2, 2, 2, 2, 2, 2, 2, 2, 2, 2, 2, 2, 2, 2, 2, 2, 2, 2 and 2 by setting the number of collection groups per unit time at "3" for the first 5 unit times, and at "2" for the next 20 unit times.

In the corresponding example shown in FIG. 7, the schedule generator 414b sets the number of collection groups per unit time at "3" for each of times 1 to 5, and at "2" for each of times 6 to 25 which are the subsequent unit times. After that, similarly, the schedule generator 414b sets the number of collection groups per unit time at "3" for each of times 26 to 30, and at "2" for each of times 31 to 50 which are the ensuing unit times.

What is more, in the case of the low-speed collection, the schedule generator 414b determines that the numbers of collection groups per unit time in the collection cycle are "1" or "0" in the form of an integer value, because "0.2" is obtained when the number (=40) of collection groups selected by the group selector 414a is divided by the number (=200) of collection cycles for the data collection.

For example, the schedule generator 414b determines: the number of collection groups per unit time is "1" for each of the first 40 unit times; and the number of collection groups per unit time is "0" for each of the next 160 unit times.

In the corresponding example shown in FIG. 7, the schedule generator 414b sets the number of collection groups per unit time at "1" for each of times 1 to 40, and at "0" for each of times 41 to 200 which are the subsequent unit times. After that, similarly, the schedule generator 414b sets the number of collection groups per unit time at "1" for each of times 201 to 240, and at "0" for each of times 241 to 400 which are the ensuing unit times.

As described above, the schedule generator 414b generates a schedule for reading data from the first storage unit 411b every unit time on the basis of: the number of subgroups selected as the collection groups by the group selector 414a; and collection cycles for the data collection.

Returning to FIG. 5, the time calculator 414c in the CPU 414 calculates the amount of time it takes to read data every unit time, as the needed readout time, on the basis of the schedule generated by the schedule generator 414b (step S107). To put it specifically, the time calculator 414c calculates the needed readout time Tt corresponding to the amount of data to be transferred, by use of Equation 1 given below, where: Cg denotes the number of collection groups per unit time in the schedule generated by the schedule generator 414b; and Vt denotes the data transfer rate corresponding to the amount of data to be transferred.

$$Tt = Cg \times Vt \quad \text{(Equation 1)}$$

In this respect, the data transfer rate Vt differs from one network card to another in terms of the transfer rate characteristic and the like. For this reason, the time calculator 414c measures the data transfer rate Vt for each of the numbers of collection groups by reading dummy data. For example, if the data transfer rate for readout of 4096-byte data is 25 microseconds, the time calculator 414c sets 25 microseconds as the data transfer rate Vt for four collection groups. If the data transfer rate for readout of 3072-byte data is 24 microseconds, the time calculator 414c sets 24 microseconds as the data transfer rate Vt for three collection groups. If the data transfer rate for readout of 2048-byte data is 22 microseconds, the time calculator 414c sets 22 microseconds as the data transfer rate Vt for two collection groups. If the data transfer rate for readout of 1024-byte data is 20 microseconds, the time calculator 414c sets 20 microseconds as the data transfer rate Vt for one collection group.

In the corresponding example shown in FIG. 7, let us assume that: the number of collection groups to be read for time 1 in the case of the high-speed collection is "10"; and as for its breakdown, the number of collection groups from which to read the 4096-byte data is "4," the number of collection groups from which to read the 3072-byte data is "3," the number of collection groups from which to read the 2048-byte data is "2," and the number of collection groups from which to read the 1028-byte data is "1." In this example, the time calculator 414c calculates that the a needed readout time Th is 236 microseconds (=25×4+24×3+22×2+20×1) by use of (Equation 1).

Furthermore, in the corresponding example shown in FIG. 7, the time calculator 414c calculates that a need readout time Tm for the middle-speed collection is 75 microseconds (=25×3) by use of (Equation 1), if the number of collection groups to be read for time 1 in the case of middle-speed collection is "3," and if all of the three collection groups are those from which to read the 4096-byte data. What is more, in the corresponding example shown in FIG. 7, the time calculator 414c calculates that a needed readout time T1 for the low-speed collection is 25 microseconds (=25×1) by use of (Equation 1), if the number of collection groups to be read for time 1 or in the case of the low-speed collection is "3," and if all of the 3 collection groups are those from which to read the 4096-byte data.

Thereafter, the time calculator 414c calculates that the needed readout time T is 336 microseconds (=236+75+25) by aggregating the needed readout times Tt (Th, Tm, T1 which respectively correspond to the amounts of data to be transferred in the high-, middle- and low-speed collections.

Returning to FIG. 5, the judgment unit 414d in the CPU 414 subsequently judges whether or not the data readout can be completed within the unit time on the basis of the needed readout time T calculated by the time calculator 414c (step S109). To put it specifically, the judgment unit 414d judges whether or not the needed readout time T calculated by the time calculator 414c is equal to or greater than a threshold length of time (step S109). In this respect, the threshold length of time Tb is defined as a time obtained by subtracting a predetermined time allowance Tc from the unit time. In this case, if the unit time and the time allowance Tc are respectively 1 millisecond and 100 microseconds, the threshold length of time Tb is 900 microseconds.

In the corresponding example shown in FIG. 7, the needed readout time T at time 1 is 336 microseconds and accordingly less than 900 microseconds which is the threshold length of time Tb. For this reason, the judgment unit 414d judges that the data readout can be completed within the unit time.

If it is judged in step S109 that the data readout cannot be completed within the unit time (if NO), the judgment unit 414d issues a warning message indicating that the data collection will be infeasible (step S111). To put it specifically, the judgment unit 414d sends the monitoring apparatus 62 a warning signal indicating the infeasibility of the data collection. The monitoring apparatus 62 causes the display apparatus 61 to display the warning message and output alarm sounds.

On the other hand, if it is judged in step S109 that the data readout can be completed within the unit time (if YES), the judgment unit 414d performs load calculation (step S113). To put it specifically, the judgment unit 414d calculates a surplus capacity by subtracting the needed readout time from the threshold length of time. For example, in the corresponding example shown in FIG. 7, since the threshold length of time Tb is 900 microseconds and the needed readout time is 336 microseconds, the judgment unit 414d calculates that the surplus capacity is 564 microseconds.

Thereafter, the judgment unit 414d judges whether or not the load falls within a tolerable range (step S115). To put it specifically, if the surplus capacity calculated in step S113 takes on a positive value, the judgment unit 414d judges that the load is within the tolerable range. If the surplus capacity calculated in step S113 is equal to or less than 0 microseconds, the judgment unit 414d judges that the load exceeds the tolerable range.

If it is judged in step S115 that the load exceeds the tolerable range (if NO), the judgment unit 414d issues a warning message indicating an overload (step S117). To put it specifically, the judgment unit 414d sends the monitoring apparatus 62 a warning signal indicating the overload. The monitoring apparatus 62 causes the display apparatus 61 to display the warning message and output alarm sounds.

On the other hand, if it is judged in step S115 that the load is within the tolerable range (if YES), the data reader 414e starts the data collection (step S119). To put it specifically, the data reader 414e reads the data from the first storage unit 411b on the basis of the schedule generated by the schedule generator 414b, associates the read data with the time measured by the timer 411a, and causes the second storage unit 412 to store the data associated with the time as the process data.

As described above, the data collection apparatus 41 provided in the data collection system 1 of the first embodiment of the present invention includes: the first storage unit 411b configured to store the data which are transmitted among the control apparatuses 21 to 23; the group selector 414a configured to divide the memory area in the first storage unit 411b into multiple groups, to further divide the memory area in each group into multiple subgroups, and to select at least one divided subgroups as a collection group, which is a unit to continuously read data in the group, in order to avoid decrease in the readout speed of the data on the basis of the data transfer rate characteristic corresponding to the size of the data; the schedule generator 414b configured to generate the schedule for reading the data from the first storage unit 411b every unit time, on the basis of the number of subgroups selected as each collection group and the collection cycle for the data collection; and the data reader 414e configured to read the data from the first storage unit 411b on the basis of the generated schedule. For these reasons, the data collection apparatus 41 is capable of collecting the data quickly regardless of the amount of data by using a simple configuration.

Figure 8:
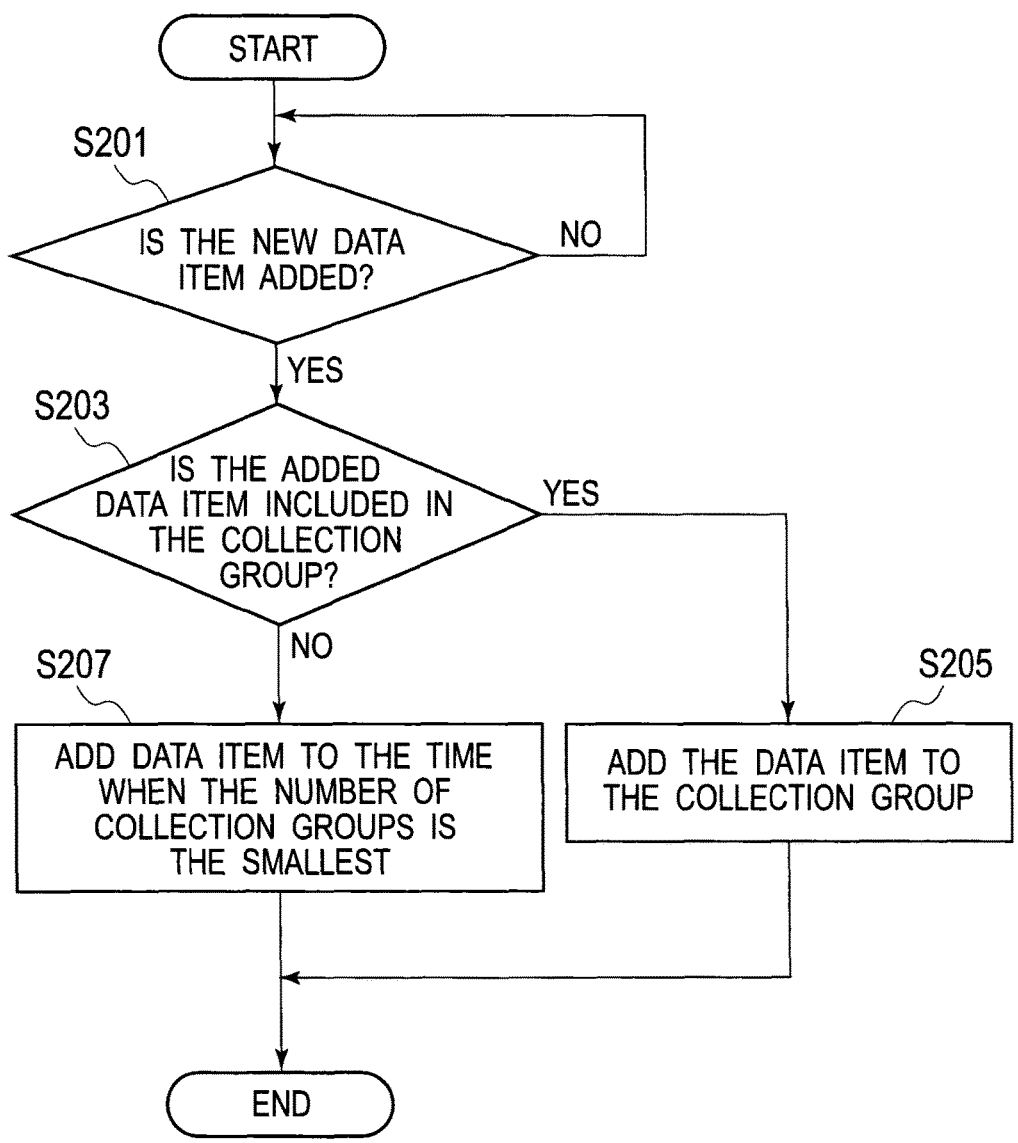
FIG. 8 is a flowchart showing process procedures of processing to be performed by the data collection apparatus included in the data collection system of the first embodiment of the present invention when a new data item to be collected is added.

FIG. 8 is a flowchart showing process procedures of processing to be performed by the data collection apparatus 41 included in the data collection system 1 of the first embodiment of the present invention when a new data item to be collected is added.

As shown in FIG. 8, if the new data item to be collected is added by a user's operation (step S201), the schedule generator 414b judges whether or not the added data item is included in the collection groups (step S203).

If it is judged in step S201 that the added data item is included in the collection groups (if YES), the schedule generator 414b adds the data item to the collection groups (step S205) since the added data item has already been one of the data collection targets.

On the other hand, if it is judged in step S201 that the added data item is not included in the collection groups (if NO), a new schedule needs to be generated since the added data item is not a data collection target yet.

To this end, the schedule generator 414b adds the data item to the time when the number of collection groups is the smallest (step S207). In the corresponding example shown in FIG. 7, if data not included in the collection groups for the high-speed collection is added, the schedule generator 414b adds the collection groups including the added data item to time 2 when the number of collection groups is the smaller of time 1 and time 2, and thereby changes the number of collection groups from "9" to "10." Similarly, the schedule generator 414b changes the number of collection groups from "9" to "10" during times 4, 6, 8, and so forth.

In this manner, the schedule generator 414b once again generates the schedule in order to read the requested data from the first storage unit 411b in a time period when the number of collection groups is the smallest. This makes it possible to collect the data quickly regardless of the amount of data by using a simple configuration, even if the data item to be collected is added in the middle of the data collection.

In the first embodiment of the present invention, the data collection apparatus 41 selects collection groups on the basis of the collection group patterns shown in FIG. 6. However, the collection group patterns are not limited to what have been shown in FIG. 6.

For example, in the first embodiment of the present invention, the group pattern 501c is indicated as "■ □ ■ □." In this case, the collection group pattern 503c is indicated as "■ □ ■." If the transfer rate characteristics make the transfer rate, namely the readout speed, become higher when the subgroups 502a, 502c are read one by one than when the subgroups 502a to 502c which includes the subgroup 502b intervening between the subgroups 502a, 502c are read, then the collection group pattern 503c may be set as "■ ■" In other words, only the subgroups 502a, 502c may be read.

Furthermore, when the data collection is started, a transfer rate at which to perform the readout from the subgroups 502a to 502c and a transfer rate at which to perform the readout from the subgroups 502a, 502c one by one may be measured. Then, the mode with the faster transfer rate may be employed.

What is more, the foregoing embodiment may be realized by causing a computer to execute a data collection program installed therein. To put it specifically, the data collection apparatuses may be constructed in a way that: the data collection program is read from a storage medium in which the data collection program is stored, and is executed by the CPU 414. Alternatively, the data collection apparatuses may be constructed in a way that: the data collection program is transmitted via a communications network, installed, and executed by the CPU 414.

1 data collection system
21 to 23 control apparatus
41 to 43 data collection apparatus
51 host network
52 control network
61 display apparatus
62 monitoring apparatus
411 first network card
411a timer
411b first storage unit
411c first storage controller
412 second storage unit
413 second network card
414 CPU
414a group selector
414b schedule generator
414c time calculator
414d judgment unit
414e data reader

INDUSTRIAL APPLICABILITY

The present invention is applicable to a data collection system for collecting plant data, and the like.

The invention claimed is:

1. A data collection apparatus comprising:
a common memory configured to store data which are sent among multiple control apparatuses by scan transmission;
a group selector configured to divide a memory area in the common memory into multiple groups, to further divide a memory area in each group into multiple subgroups, and to select one or more of the subgroups, as collection groups from which data is continuously read, in order to avoid decrease in a readout speed of the data on the basis of a data transfer rate characteristic corresponding to a size of the data;
a schedule generator configured to generate a schedule for reading the data from the common memory in allotted time intervals by determining a number of collection groups in the allotted time intervals for each of a high-speed collection, a middle-speed collection, and a low-speed collection, the number of collection groups being determined as an integer value on the basis of a division value obtained by dividing a number of subgroups selected as collection groups by collection cycles for collecting the data, the high-speed collection being faster than the middle-speed collection, the middle-speed collection being faster than the low-speed collection;
a time calculator configured to calculate as a needed readout time, a value based on a data transfer rate and the number of collection groups per allotted time interval in the schedule generated by the schedule generator;
a judgment circuit configured to judge whether or not the readout of the data can be completed within a corresponding allotted time interval, on the basis of the needed readout time calculated by the time calculator; and a data reader configured to read the data from the common memory, only if the judgement circuit judges that the readout of the data can be completed within the allotted time interval.

2. The data collection apparatus of claim 1, wherein if the needed readout time calculated by the time calculator is equal to or greater than a threshold length of time obtained by subtracting a predetermined time allowance from the allotted time interval, the judgment circuit judges that the readout of the data cannot be completed within the allotted time interval, and issues a warning.

3. The data collection apparatus of claim 1, wherein if data requested to be read are not included in the selected subgroups, the schedule generator once again generates the schedule in order to read the requested data from the common memory in a time period when the number of collection groups per allotted time interval is the smallest.

4. The data collection apparatus of claim 1 wherein the group selector divides the memory area in the common memory into multiple hierarchical groups in order of size.

5. A non-transitory computer-readable medium encoded with computer-readable instructions that, when executed by a computer, cause the computer to perform a method comprising:
storing data, which are sent among multiple control apparatuses by scan transmission, in a common memory;
dividing a memory area in the common memory into multiple groups, further dividing a memory area in each group into multiple subgroups, and selecting one or more of the subgroups, as collection groups from which data is continuously read, in order to avoid decrease in a readout speed of the data on the basis of a data transfer rate characteristic corresponding to a size of the data;
generating a schedule for reading the data from the common memory in allotted time intervals by determining a number of collection groups in the allotted time intervals for each of a high-speed collection, a middle-speed collection, and a low-speed collection, the number of collection groups being determined as an integer value on the basis of a division value obtained by dividing a number of subgroups selected as collection groups by collection cycles for collecting the data, the high-speed collection being faster than the middle-speed collection, the middle-speed collection being faster than the low-speed collection;
calculating as a needed readout time, a value based on a data transfer rate and the number of collection groups per allotted time interval in the schedule generated in the generating step;
judging whether or not the readout of the data can be completed within a corresponding allotted time interval, on the basis of the needed readout time calculated in the calculating step;
reading the data from the common memory, only if the readout of the data is judged to be able to be completed within the allotted time interval.

6. The non-transitory computer-readable medium of claim 5, wherein
if the needed readout time calculated is equal to or greater than a threshold length of time obtained by subtracting a predetermined time allowance from the allotted time interval, judgment is made that the readout of the data cannot be completed within the allotted time interval and a warning is issued.

7. The non-transitory computer-readable medium of claim 5, wherein if data requested to be read are not included in the selected subgroups, the schedule is generated once again in order to read the requested data from the common memory in a time period when the number of collection groups per allotted time interval is the smallest.

* * * * *